United States Patent
Blass et al.

[11] Patent Number: 6,073,467
[45] Date of Patent: Jun. 13, 2000

[54] CATALYST GAUZES FOR GASEOUS REACTIONS

[75] Inventors: Siegfried Blass, Alzenau; Horst Dübler, Hanau; Dietmar Königs, Gelnhausen; Thomas Stoll, Reutlingen; Harald Voss, Alzenau, all of Germany

[73] Assignee: Degussa Aktiengesellschaft, Frankfurt am Main, Germany

[21] Appl. No.: 08/828,146

[22] Filed: Mar. 24, 1997

Related U.S. Application Data

[63] Continuation-in-part of application No. 08/440,308, Apr. 5, 1995, abandoned.

[30] Foreign Application Priority Data

Apr. 6, 1994 [DE] Germany ............... 44 11 774

[51] Int. Cl.⁷ ............... D04B 1/22; B21F 27/02
[52] U.S. Cl. ............... 66/170; 66/196; 66/202; 245/5
[58] Field of Search ............ 66/202, 170, 169 R, 66/194, 195, 196; 442/52, 316; 245/5, 2

[56] References Cited

U.S. PATENT DOCUMENTS

| | | | |
|---|---|---|---|
| 2,274,684 | 3/1942 | Goodloe | 66/202 |
| 3,993,600 | 11/1976 | Hunter | 55/525 |
| 4,375,426 | 3/1983 | Knapton et al. | 442/316 |
| 4,435,373 | 3/1984 | Knapton et al. | 442/316 |
| 4,609,923 | 9/1986 | Boan . | |
| 4,869,891 | 9/1989 | Handley | 428/253 |
| 5,188,813 | 2/1993 | Fairey et al. | 66/202 |
| 5,699,680 | 12/1997 | Guerlet et al. | 66/202 |

FOREIGN PATENT DOCUMENTS

| | | |
|---|---|---|
| 0061304 | 9/1982 | European Pat. Off. . |
| 0364153 | 4/1990 | European Pat. Off. . |
| 0504723 | 9/1992 | European Pat. Off. . |
| 2829035 | 1/1980 | Germany . |
| 61-282584 | 12/1986 | Japan . |
| 549418 | 4/1942 | United Kingdom . |
| 1411800 | 10/1973 | United Kingdom . |
| 2088914 | 6/1982 | United Kingdom . |
| 92/02300 | 2/1992 | WIPO . |
| 92/02301 | 2/1992 | WIPO . |

*Primary Examiner*—Michael A. Neas
*Assistant Examiner*—Larry D. Worrell, Jr.
*Attorney, Agent, or Firm*—Beveridge, DeGrandi, Weilacher & Young, LLP

[57] ABSTRACT

Three-dimensional knitted catalyst gauzes made from noble metals have recently come into use for ammonia oxidation and other gaseous reactions. Particularly high yields accompanied by a stable course of the reaction and an extended service life of the catalyst gauze are achieved if the catalyst gauzes are knitted in two or more layers and the layers are connected together by pile threads. Important features are the largest possible number of pile threads per unit area and the alignment thereof as parallel as possible to the direction of flow of the reaction gases.

6 Claims, 3 Drawing Sheets

CATALYST GAUZES FOR GASEOUS REACTIONS

REFERENCE TO A RELATED APPLICATION

This application is a continuation-in-part of our application Ser. No. 08/440,308 filed Apr. 5, 1995 now abandoned.

INTRODUCTION AND BACKGROUND

The present invention relates to a three-dimensional knitted noble metal gauze suitable for carrying out catalytic gaseous reactions, in particular for the catalytic oxidation of ammonia with air to obtain nitric acid.

The use of noble metal catalysts in the form of gas-permeable woven fabrics is a proven method for operating certain catalytic processes at optimum yields. Catalyst gauzes for ammonia oxidation processes are well known and are generally formed of a platinum or a platinum alloy wire. A known example is the use of platinum/rhodium catalyst gauzes in the combustion of ammonia for nitric acid production. This reaction can be represented by the equations below:

$$4NH_3 + 5O_2 \rightarrow 4NO + 6H_2O$$

$$2NO + O_2 \rightarrow 2NO_2$$

$$3NO_2 + H_2O \rightarrow 2HNO_3 + NO$$

Woven gauzes based on palladium are used in ammonia oxidation plants to act as "getters" or collectors of platinum lost by the chemical action from the catalyst gauzes.

Catalyst gauzes are normally produced on weaving looms from thin noble metal wires. It is also known to knit metal wires into knitted metal fabrics of ferrous alloys, e.g. stainless steel. Uses proposed for such fabrics include spray separators for evaporators, for conveyor belting, filter components and the like. A process for the production of catalyst gauzes from noble metal wires by knitting has recently been disclosed by EP-A-0 364 153 corresponding to U.S. Pat. No. 5,188,813. This document also mentions three-dimensional knitting, but no further details concerning the structure of these knitted fabrics are given.

As stated therein, it has it has also been suggested to sputter metal onto a woven or knitted synthetic fabric (Japanese publication 61282584) to obtain a heat reflective curtain material. A metal-plated optical fiber knitted fabric has been suggested as an electromagnetic shielding material. U.S. Pat. No. 4,609,923 discloses a knitted gold-plated tungsten wire for use as a radio frequency reflector; such a material possesses sufficient tensile strength and other properties to permit knitting. In the art of ammonia oxidation, Great Britain Patent 1,411,800 mentions the use of knitted heat resistant alloy wire as a support element for conventional woven catalyst gauzes, but does not contemplate a knitted catalyst fabric.

Great Britain Specification 2,088,914A discloses fabrics from brittle reinforcing fibers, especially weaving carbon fibers. The possibility of applying the technique to brittle metal fibers and tungsten is mentioned. Precious metal fibers are not brittle in the manner of carbon fibers and are known to be capable of being woven.

Great Britain Specification 549,418 discloses woven or knitted iron, steel or brass fabrics in which a textile fiber such as cotton wool or rayon is incorporated with the metal wire to act as an absorbent for oil in an air filter for engines.

The techniques for weaving metal screen, meshes or gauzes is well known including composition of the wires or thread, thickness of thread, thickness of gauzes etc.

Knitted gauzes, like all catalyst gauzes, have the advantage of a large catalytic surface area combined with elevated mechanical strength and simple production techniques. However, the relatively large losses of noble metal during the reaction and the associated short service life of the gauzes are disadvantageous. Moreover, if the catalyst gauze wires are predominantly arranged perpendicular to the direction of flow of the gas stream, the course of the reaction becomes unstable on the wire surfaces with corresponding temperature oscillations. This brings about a non-linear course of the reaction and has a negative effect on product yield and the service life of the gauzes.

SUMMARY OF THE INVENTION

An object of the present invention is to provide a three-dimensional knitted noble metal gauze for carrying out gaseous reactions, in particular for the catalytic oxidation of ammonia with air in nitric acid production, which ensures elevated product yields and a stable course of the reaction. A further object of the invention is to extend service life of the catalyst gauzes with the smallest possible noble metal losses.

These and other objects are achieved according to the invention by the gauzes being knitted in two or more layers and the stitches of the individual layers being connected together by pile threads, wherein up to ten pile threads are present per stitch and the pile threads must be arranged at an angle of 40 to 90 degrees relative to the direction of the gauze surface.

BRIEF DESCRIPTION OF DRAWINGS

The present invention will be further understood with reference to the drawings, wherein.

DETAILED DESCRIPTION OF INVENTION

Gauzes are preferably used in which two to six pile threads are present per stitch. The pile threads are advantageously of a length of 1 to 10 mm. It is moreover advantageous if the pile threads deviate in their alignment relative to the orientation of the gauze surface by an angle of at most 60 to 90 degrees. Angles of 75 to 90 degrees are particularly favorable.

Figure 1:
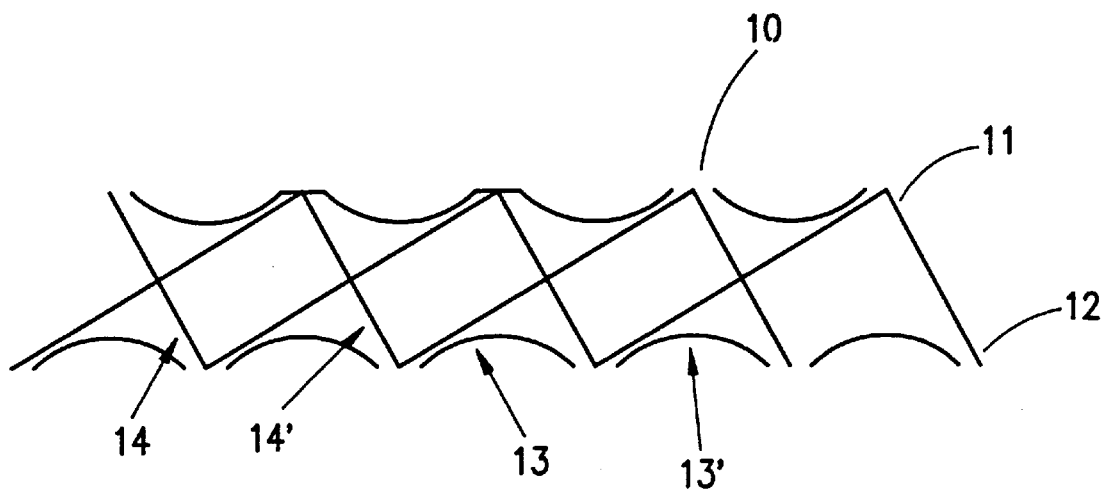
FIG. 1 is a schematic cross sectional view of a three dimensional knitted gauge with two layers of stitches according to the invention.
Figure 2:
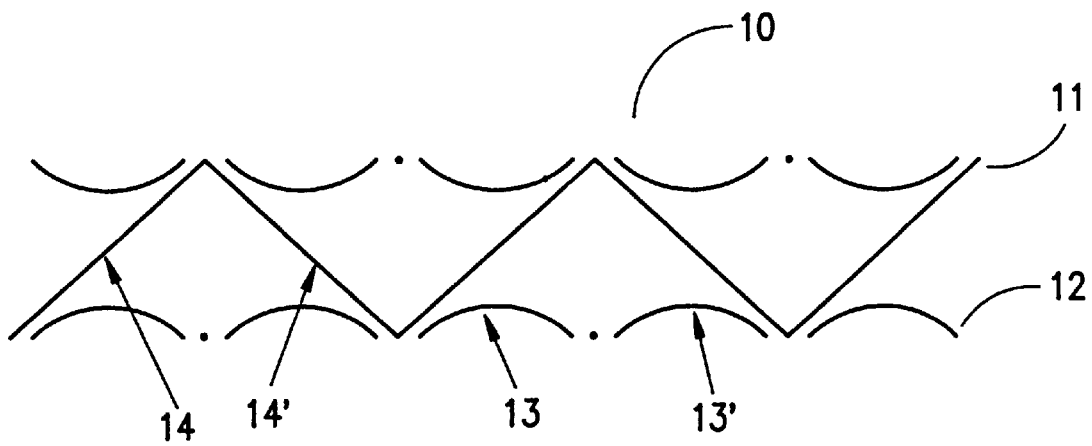
FIG. 2 is a schematic cross sectional view of another embodiment of a three dimensional knitted gauge with two layers of stitches according to the invention.

As shown in FIG. 1, the catalyst gauze of the invention 10 is formed of a multilayer structure including a top layer 11 and a lower layer 12. Gas flow direction is shown by the vertical arrows and is perpendicular to the orientation of the stitches. Each layer is formed of a plurality of stitches 13, 13'. The stitches of the individual layers are connected together by pile threads 14, 14'. There can be up to ten pile threads present per stitch. It is a feature of the invention that the pile threads (14, 14') are oriented at an angle of 40 to 90 degrees with respect to the gauze surface (11).

Such catalyst gauze configurations lead to a significant increase in yield in industrial nitric acid production, it consequently being possible to realize economies in the use of noble metal when charging the reactor this leads to a reduction in noble metal losses and an increase in the service life of the catalyst gauze in the reactor.

Figure 3:
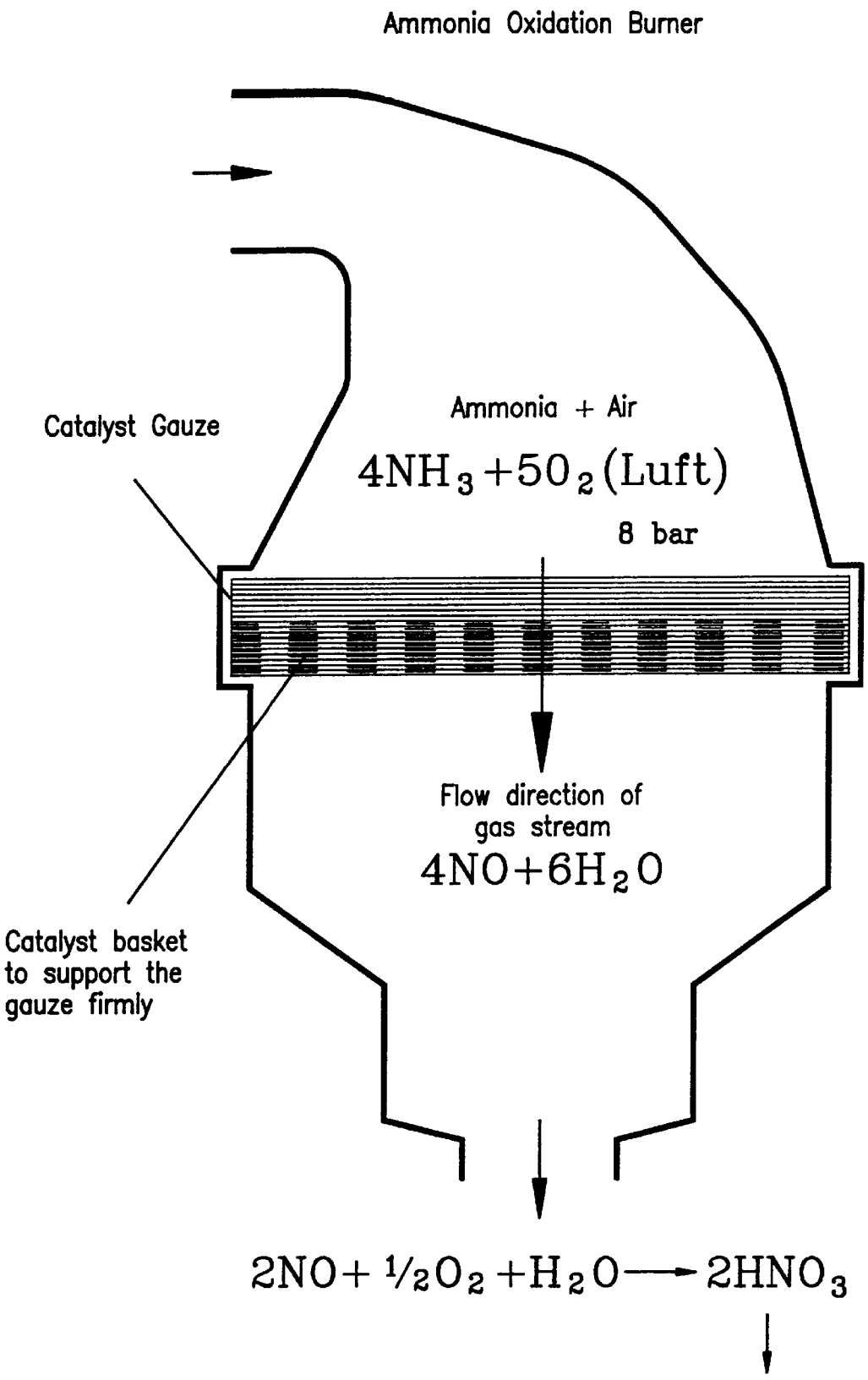
FIG. 3 is a schematic cross sectional view of an ammonia oxidation burner with the catalyst gauze installed according to the invention.

The ammonia oxidation burner unit, shown schematically in FIG. 3 can be of any convenient design provided it has an internal fitting such as a basket for holding the catalyst gauze. The ammonia and air stream flow through the catalyst gauze in the direction of the arrow which is typically perpendicular to the gauze orientation. The thickness of the gauze layer, flow rate and the like are matters within the skill of the art.

Figure 4:
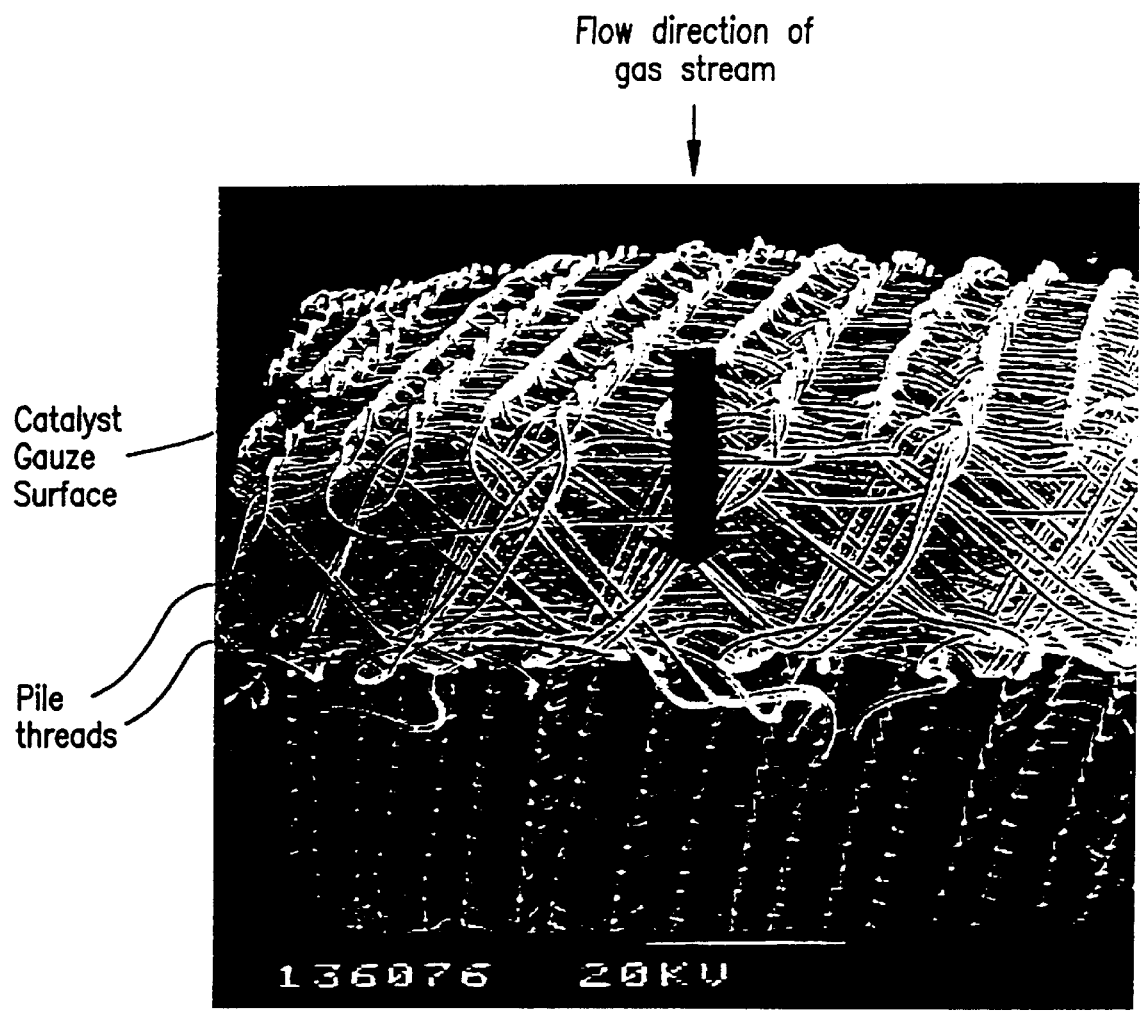
FIG. 4 is a perspective view of the catalyst gauze of the present invention.

FIG. 4 is a depiction of the woven catalyst gauze showing the orientation of the pile threads with respect to the upper surface and lower surface of the gauze. A single layer of upper stitches and lower stitches is shown in FIG. 4 and it will be understood that the actual gauzes used in the process can be formed of multiple layers of the single layer of FIG. 4; i.e. the gauzes can be stacked. As used herein, the terms "upper surface" and "lower surface" (11, 12) are intended to define the structures formed by the stitches (13, 13') connected by the pile threads (14, 14'). Thus, the top surface is the upper layer of stitches (13, 13') and the lower surface of the catalyst gauze is formed by the lower layer of stitches. Thus, the overall structure has spaces between the stitches to permit the gas flow to pass through the catalyst gauze. The stitches are oriented generally perpendicular to the gas flow through the gauze structure and the top stitches and bottom stitches forming the individual layers of the catalyst gauze are connected by the pile threads as shown in FIG. 4. Surprisingly, temperature oscillations and local overheating during the reaction on the catalyst gauze are suppressed.

Flat bed knitting machines having at least two beds of needles are preferably used to produce such catalyst gauzes. The pile threads are produced by connecting the stitches of the front and back needle bed. Pile threads may also be inserted repeatedly into a row of stitches in order to obtain a high proportion of such threads per unit area. This additionally increases the compressive strength and stability of the gauzes. For an identical area weight, these gauzes have better homogeneity than individual woven or knitted gauzes arranged in two or more layers.

Further variations and modifications of the foregoing will be apparent to those skilled in the art and are intended to be encompassed by the claims appended hereto.

German priority application P 44 11 774.4 is relied on and incorporated herein by reference.

We claim:

1. A three-dimensional knitted noble metal gauze for performing catalytic gaseous reactions comprising a gauze knitted in a plurality of layers having a plurality of stitches, forming a top surface and a parallel bottom surface, the stitches of said layers being connected together by pile threads, wherein from two to ten pile threads are present per stitch and the pile threads are aligned at an angle of 40 to 90 degrees relative to the top surface and bottom surface of the gauze.

2. The noble metal gauze according to claim 1, wherein two to six pile threads are present per stitch.

3. The noble metal gauze according to claim 1, wherein the pile threads have a length of 1 to 10 mm.

4. The noble metal gauze according to claim 1 wherein the noble metal is platinum/rhodium.

5. The noble metal gauze according to claim 1 wherein the pile threads are aligned at an angle of 60 to 90 degrees relative to the top surface and bottom surface of the gauze.

6. A method of catalyzing gaseous reactions comprising oxidizing a stream of ammonia flowing through the gauze defined in claim 1 to form nitric acid.

* * * * *